United States Patent
Lecue et al.

(10) Patent No.: US 10,339,420 B1
(45) Date of Patent: Jul. 2, 2019

(54) ENTITY RECOGNITION USING MULTIPLE DATA STREAMS TO SUPPLEMENT MISSING INFORMATION ASSOCIATED WITH AN ENTITY

(71) Applicant: Accenture Global Solutions Limited, Dublin (IE)

(72) Inventors: Freddy Lecue, Castleknock (IE); Md Faisal Zaman, Drumcondra (IE)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/117,475

(22) Filed: Aug. 30, 2018

(51) Int. Cl.
*G06K 9/62* (2006.01)
*G06N 5/04* (2006.01)
*G06N 20/00* (2019.01)
*G06F 16/901* (2019.01)

(52) U.S. Cl.
CPC ....... *G06K 9/6232* (2013.01); *G06F 16/9024* (2019.01); *G06K 9/6201* (2013.01); *G06K 9/6289* (2013.01); *G06N 5/048* (2013.01); *G06N 20/00* (2019.01)

(58) Field of Classification Search
CPC .. G06K 9/6232; G06K 9/6289; G06K 9/6201; G06N 5/048; G06N 99/005; G06F 17/30958
See application file for complete search history.

(56) References Cited

U.S. PATENT DOCUMENTS

| | | | | |
|---|---|---|---|---|
| 2007/0239314 A1* | 10/2007 | Kuvich | ................ | G06K 9/4628 700/245 |
| 2016/0180235 A1* | 6/2016 | Sabah | ................ | G06F 17/3053 706/52 |
| 2016/0328443 A1* | 11/2016 | Abraham | ............ | G06F 16/2453 |
| 2016/0378861 A1* | 12/2016 | Eledath | .............. | G06K 9/00718 707/766 |

* cited by examiner

*Primary Examiner* — Menatoallah Youssef
(74) *Attorney, Agent, or Firm* — Harrity & Harrity, LLP

(57) ABSTRACT

An example method described herein involves receiving a first data stream and a second data stream; determining that a plurality of entities are present in the image data of the first data stream; analyzing the first data stream to determine that an entity, of the plurality of entities, is unrecognizable in the image data of the first data stream; obtaining, by the device, a common knowledge graph associated with the first data stream and the second data stream, wherein the common knowledge graph includes information regarding the plurality of entities; annotating the common knowledge graph with first corresponding recognizable characteristics of the plurality of entities in the first data stream to generate a first annotated knowledge graph; annotating the common knowledge graph with second corresponding recognizable characteristics of the plurality of entities in the second data stream to generate a second annotated knowledge graph; determining whether the entity is recognizable based on the first annotated knowledge graph and the second annotated knowledge graph; and/or performing an action associated with the first data stream based on whether the entity is recognizable.

20 Claims, 8 Drawing Sheets

ENTITY RECOGNITION USING MULTIPLE DATA STREAMS TO SUPPLEMENT MISSING INFORMATION ASSOCIATED WITH AN ENTITY

BACKGROUND

A knowledge graph may be used to represent, name, and/or define a particular category, property, or relation between classes, topics, data, and/or entities of a domain. A knowledge graph may include nodes that represent the classes, topics, data, and/or entities of a domain and edges linking the nodes that represent a relationship between the classes, topics, data, and/or entities of the domain. Knowledge graphs may be used in classification systems, machine learning, computing, and/or the like.

SUMMARY

According to some implementations, a method may include receiving a first data stream and a second data stream; determining that a plurality of entities are present in the image data of the first data stream; analyzing the first data stream to determine that an entity, of the plurality of entities, is unrecognizable in the image data of the first data stream; obtaining, by the device, a common knowledge graph associated with the first data stream and the second data stream, wherein the common knowledge graph includes information regarding the plurality of entities; annotating the common knowledge graph with first corresponding recognizable characteristics of the plurality of entities in the first data stream to generate a first annotated knowledge graph; annotating the common knowledge graph with second corresponding recognizable characteristics of the plurality of entities in the second data stream to generate a second annotated knowledge graph; determining whether the entity is recognizable based on the first annotated knowledge graph and the second annotated knowledge graph; and/or performing an action associated with the first data stream based on whether the entity is recognizable.

According to some implementations, a device may include one or more memories; and one or more processors, communicatively coupled to the one or more memories, to: receive a first data stream and a second data stream; obtain a common knowledge graph associated with the first data stream and the second data stream, wherein the common knowledge graph includes information associated with the first data stream and the second data stream; detect that an entity is an unrecognizable entity in the first data stream based on the entity having an unrecognizable characteristic in the first data stream; annotate the common knowledge graph with the unrecognizable characteristic and first corresponding recognizable characteristics of entities identified in the first data stream to generate a first annotated knowledge graph; annotate the common knowledge graph with second corresponding recognizable characteristics of entities identified in the second data stream to generate a second annotated knowledge graph; determine, based on the first annotated knowledge graph and the second annotated knowledge graph, whether one of the second corresponding recognizable characteristics in the second annotated knowledge graph corresponds to the unrecognizable characteristic in the first annotated knowledge graph; determine a probability that the entity is an identifiable entity based on whether the one of the second corresponding recognizable characteristics corresponds to the unrecognizable characteristic; and/or perform an action based on the probability.

According to some implementations, a non-transitory computer-readable medium may store instructions that, when executed by one or more processors, cause the one or more processors to: receive a data input; determine a represented set of data for a first set of topics of a plurality of topics of the data input based on a domain knowledge graph of the plurality of topics; determine an underrepresented set of data for a second set of topics of the plurality of topics based on a representative learning technique, wherein the underrepresented set of data is underrepresented relative to the represented set of data; calculate a score for each topic of the plurality of topics based on the representative learning technique; determine that the score for a first topic of the plurality of topics satisfies a threshold score; determine that the first topic of the plurality of topics is one of the second set of topics; select a topic specific knowledge graph based on the first topic being one of the second set of topics; identify representative objects that are similar to objects of the data input based on the topic specific knowledge graph; generate representation data that is similar to the data input based on the representative objects by substituting one of the representative objects with a corresponding object of the data input according to the topic specific knowledge graph and the domain knowledge graph; generate a representation knowledge graph based on the representation data, wherein the representation knowledge graph includes a new topic that is associated with the underrepresented set of data; and/or store the representation knowledge graph in a knowledge graph data structure, wherein the knowledge graph data structure stores the domain knowledge graph and the topic specific knowledge graph.

DETAILED DESCRIPTION

Figure 1:
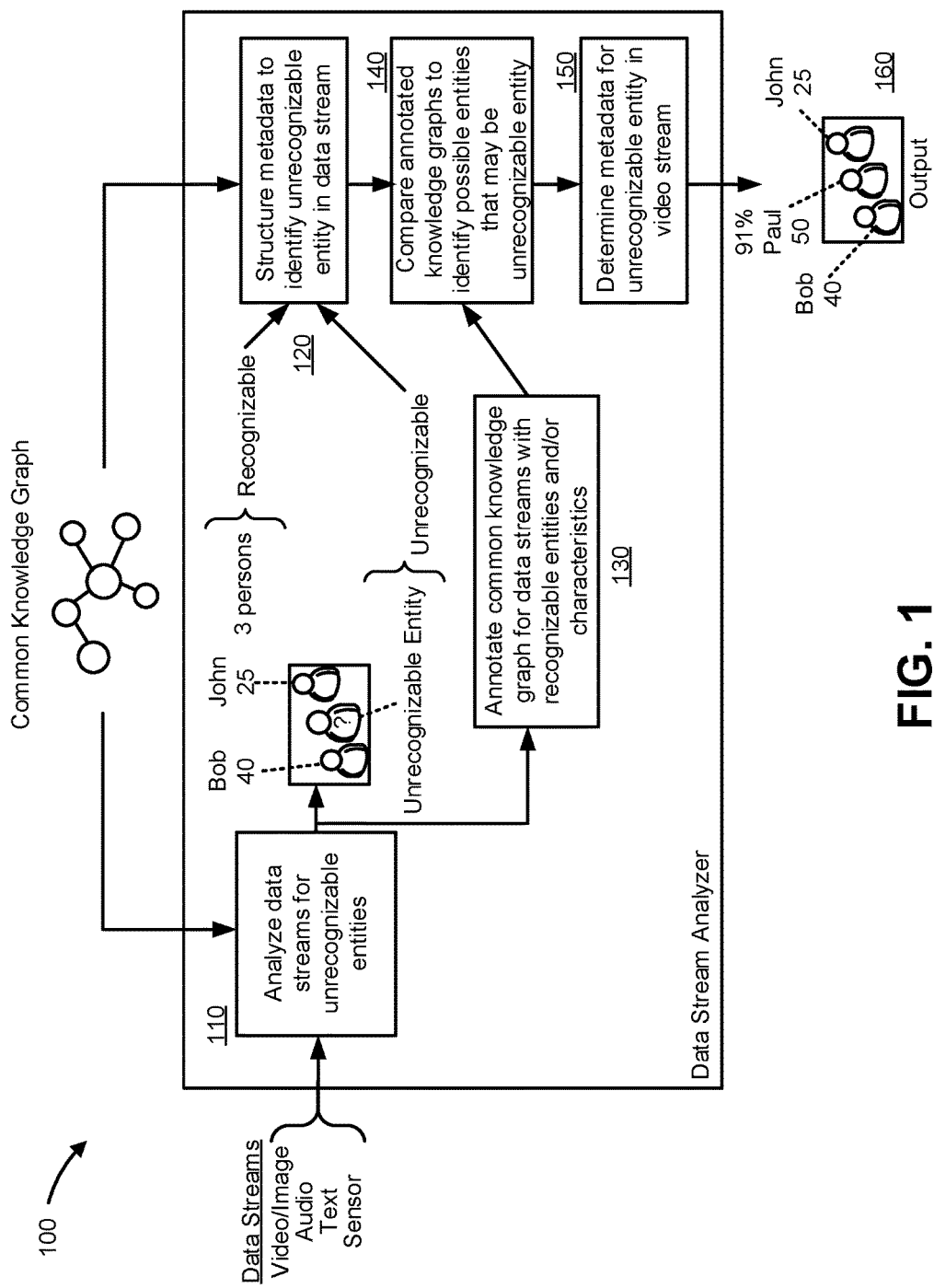
FIG. 1 is a diagram of an example implementation described herein.

The following detailed description of example implementations refers to the accompanying drawings. The same reference numbers in different drawings may identify the same or similar elements.

Recognizing an entity within a data stream (e.g., a video stream, an audio stream, a text stream, and/or the like) may be useful in various applications, such as data mining, e-discovery, user profiling, and/or the like. A data stream may include a series or sequence of data that includes information. The data stream may be provided by one or more devices, such as cameras, microphones, user devices, servers, and/or the like. Various techniques (e.g., object recognition, character recognition, voice recognition, speech to text techniques, and/or the like) can be used to recognize entities within a data stream. However, in some instances, certain characteristics of the entities may cause the entities to be unrecognizable. For example, in a video stream (which may include image data or a stream of images), if identifiable features of a person (e.g., the person's face) are not included within any images or portions of the video stream (e.g., because the person's back is toward a camera capturing images of the video stream), the person may not be recognizable. Additionally, or alternatively, in text data (e.g., a text file, such as a profile (e.g., of an entity), a transcript of a conversation, a book, a newspaper article, and/or the like) or a text stream (e.g., a series of text messages, emails and/or the like, and/or the like), if a person is discussed in the text stream but the person's name is not included within the text stream (e.g., the person is referred to by pronouns), the person discussed may not be identifiable.

Some implementations, as described herein, enable a data stream analyzer to detect missing information within a data stream and supplement that missing information using information from another data stream that is associated with the data stream. For example, as described herein, the data stream analyzer may detect an unrecognizable entity or an entity that has an unrecognizable characteristic in a data stream and use data and/or information from another data stream (or set of data) to recognize the entity or identify a recognizable characteristic of the entity that corresponds to the unrecognizable entity. Accordingly, in such a case, the unrecognizable entity in the data stream can be recognized (or at least a probability that the entity is a particular entity can be recognized) using information from the other data stream. For example, if an entity within a video stream associated with an event cannot be recognized (e.g., because a recognizable characteristic (e.g., a name of the entity, a face of the entity, a sound associated with the entity, and/or the like) of the entity is not in the video stream), then the data stream analyzer may use another data stream (e.g., another video stream of the event, an audio stream of the event, a text stream (or conversation) associated with the event, a transcript of the event, and/or the like) to recognize the entity using data and/or information in the other data stream. In some implementations, one or more knowledge graphs may be used and/or generated to identify an unrecognizable characteristic of an entity in one data stream and to identify a corresponding recognizable characteristic of the entity in another data stream. For example, the data stream analyzer may annotate a common knowledge graph (e.g., a knowledge graph that is associated with both data streams or a set of data streams) with identifiable information in each data stream to generate annotated knowledge graphs for the data streams. The data stream analyzer may compare the annotated knowledge graphs to determine whether missing information in one data stream is included in the other data stream and/or a probability that the missing information in the one data stream corresponds to information that is in the other data stream.

In this way, several different stages of a process for analyzing data streams to recognize one or more entities in (or one or more entities represented within) the data streams are automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to determine that an entity in a first data stream is unrecognizable (e.g., based on the entity having an unrecognizable characteristic) and recognizing that entity using data from a second data stream. Accordingly, computing resources associated with incorrectly determining that an entity is not included within a data stream, using previous techniques, can be conserved. Finally, automating the process for identifying unrecognizable entities in a data stream using information from another data stream conserves computing resources (e.g., processor resources, memory resources, and/or the like) that would otherwise be wasted by a user scanning through the data stream and/or other data streams to identify the entity.

FIG. 1 is a diagram of an example implementation 100 described herein. Example implementation 100 may be associated with and/or implemented via a data stream analyzer configured to identify missing information in one data stream and supplement that missing information with information from another data stream. As further described herein, the data stream analyzer may receive a plurality of data streams, identify information within the plurality of data streams in association with a common knowledge graph, identify missing information in one data stream based on the common knowledge graph and/or characteristics of the one data stream, and find corresponding information within one or more other data streams to determine the content of the missing information or at least a probability of what the content of the missing information may be. Accordingly, in example implementation 100, information that is missing in one data stream can be supplemented with information from another data stream (e.g., another data stream associated with a same event, location, entity, time period, and/or the like of the one data stream). As such, the data stream analyzer, using information from other data streams, can properly identify an entity within one data stream and/or correspondingly classify the one data stream as including that entity despite the entity being unrecognizable within that one data stream based on the data of the one data stream.

As shown in FIG. 1, and by reference number 110, the data stream analyzer receives a plurality of data streams and a common knowledge graph to analyze the data streams for unrecognizable entities. As used herein, an entity may refer to any object, feature, person, thing, landscape, location, and/or the like that may be represented within a data stream. Further, as described herein, an entity being described within a data stream refers to information and/or data representative of the entity being within the data stream. As shown in the example of FIG. 1, the data stream analyzer may receive one or more video and/or image streams (referred to herein as a video stream), audio streams, text streams, and/or sensor streams, though other types of data streams and/or combinations of data streams may be received.

The data streams may be received from another device (e.g., a user device, such as a computer, a mobile phone, a tablet computer, a server, and/or the like), from a data structure (e.g., a database, a table, a task graph, an index, and/or the like), and/or from one or more devices generating the data streams. Such devices that generate the data streams may include one or more of a camera, a microphone, a speech to text device, a sensor device (e.g., a sensor of a wearable device, a health monitor, a location sensing or detecting device, a motion sensor, an internet of things (IoT) device, and/or the like), and/or the like. In some implementations, the data stream analyzer may be configured to monitor one or more events, locations, persons, things, and/or the like. For example, a plurality of devices (e.g., cameras, microphones, and/or the like) may be configured to monitor a scene. In such a case, the plurality of devices may provide the plurality of data streams to the data stream analyzer to enable the data stream analyzer to identify entities (e.g., persons, objects, text, and/or the like) within the scene as described herein. In some implementations, the data streams may be associated with a same time period. For example, multiple video streams of a same event or same place may be captured at a same time. Additionally, or alternatively, the data streams may be associated with different time periods. For example, multiple video streams from a same camera may be captured at different moments in time (e.g., moments that are hours, days, weeks, months, and/or the like from one another).

The common knowledge graph may be a knowledge graph that includes information associated with the data streams. The common knowledge graph may be a general and/or reference knowledge graph that includes non-specific information about entities or characteristics of entities that may be identifiable within the data streams. For example, the common knowledge graph may indicate that certain entities (e.g., a person, an object, an animal, a location, an organization, and/or the like) may be referenced within the data stream and that the entities may have general characteristics, such as physical features (e.g., a person may have a face, hands, legs, and/or the like), a name, a sound (e.g., a person may have a recognizable voice), an age, an ability to perform an action, and/or the like. Additionally, or alternatively, the common knowledge graph may include information that is commonly known to the plurality of data streams. For example, the common knowledge graph may include a knowledge graph of identifiable entities (e.g., as nodes) that are known or that are likely to be within the data streams along with corresponding characteristics (e.g., as nodes linked to the entities via edges) of the entities that may be identified within the data streams. Accordingly, the common knowledge graph may be any type of knowledge graph that includes information that is common to the plurality of data streams.

In this way, the data stream analyzer may receive data streams and/or obtain a common knowledge graph associated with the data streams to analyze the data streams and/or recognize entities within the data streams, as described herein.

As further shown in FIG. 1, and by reference number 120, the data stream analyzer structures metadata to identify an unrecognizable entity in a data stream (e.g., using the common knowledge graph). According to some implementations, the data stream analyzer may structure the metadata to determine whether any information associated with entities in the data stream is missing or unrecognizable. For example, the data stream analyzer may determine that one or more entities in one of the data streams are not recognizable based on the one or more entities having one or more unrecognizable characteristics. As shown in FIG. 1, a frame of a video stream with three entities may be detected (e.g., using an object (or person) recognition technique). Two of the three entities may be recognizable as Bob and John (e.g., using a facial recognition technique). In some implementations, the ages of Bob and John may be obtained using additional information associated with the video stream (e.g., metadata, context of a conversation (e.g., Bob and John discussed corresponding ages)) and/or another stream. The third entity may be an unrecognizable entity (e.g., because a back of the entity faces the camera and the facial recognition technique could not detect the face of the entity). As such, recognizable characteristics from the example video stream may be structured within metadata of the video stream, indicating that Bob, age 40, and John, age 25, are in the video stream. In some implementations, the metadata can be appended to the video stream, stored in association with the video stream, and/or stored in a data structure (e.g., a table, an index, and/or the like) associated with the video stream.

In some implementations, the data stream analyzer may use machine learning to train a model for identifying information and/or metadata associated with a data stream. For example, the data stream analyzer may train the model to detect an entity and/or a characteristic of an entity based on one or more parameters (e.g., an image of the entity or characteristic, an identifier of the entity or characteristic (e.g., a name, number, and/or the like), a sound associated with the entity or characteristic, and/or the like) and/or techniques for detecting the entity and/or the characteristic of the entity, such as one or more object recognition techniques, facial recognition techniques, speech recognition techniques, character recognition techniques, and/or the like. The data stream analyzer may train the model using historical data associated with detecting entities and/or characteristics of the entities (e.g., using past analyses of the plurality of data streams or other data streams). Using the historical data and the one or more parameters and/or techniques for detecting the entity or characteristic (e.g., using the one or more parameters or techniques as inputs to the model for detecting the entity or characteristic), the data stream analyzer may detect that an entity (or a specific entity) and/or a characteristic of the entity is represented within the data stream.

In this way, the data stream analyzer may structure metadata to identify recognizable and/or unrecognizable entities within a data stream and corresponding recognizable and/or unrecognizable characteristics of the entities in the data stream.

As further shown in FIG. 1, and by reference number 130, the data stream analyzer annotates the common knowledge graph for the data streams with information associated with recognizable entities and/or recognizable characteristics of the entities. According to some implementations, the data stream analyzer may annotate the common knowledge graph by appending and/or filling in information corresponding to nodes and/or edges of the common knowledge graph. For example, for an entity node of a common knowledge graph that corresponds to a person, the data stream analyzer may annotate nodes around a person node with characteristics of a person that is identified in the data stream. For example, the person node may be an internal node in the common knowledge graph, and general characteristics of a person may be nodes linked to the person node. As such, the data stream analyzer, by annotating the common knowledge graph with information from the data streams may generate annotated knowledge graphs for the corresponding data streams.

To annotate the common knowledge graph, the data stream analyzer may use any suitable data analysis technique (e.g., an object recognition technique, a facial recognition technique, a speech recognition technique, a character recognition technique, and/or the like) to identify recognizable characteristics of an entity in a data stream. The data stream analyzer may associate the recognizable characteristics to corresponding nodes of the common knowledge graph. For example, if an entity's name is identified, the data stream analyzer may annotate a name node with information or data identifying the name or if an entity's face is identified, the data stream analyzer may annotate a face node with information or data representative of the face of the entity. In some implementations, the data stream analyzer may indicate that an unrecognizable characteristic corresponds to a particular node of the common knowledge graph that corresponds to the unrecognizable characteristic. For example, if an entity's back is identified in an image (which enables a determination that there is an entity, but that that specific entity is unrecognizable), the data stream analyzer may annotate a back node with data representative of the back of the entity.

In some implementations, the data stream analyzer may use machine learning to train a model for identifying information in a data stream and annotating the common knowledge graph with the information. For example, the data stream analyzer may train the model to detect a type of entity and/or a type of characteristic of an entity based on one or more parameters (e.g., an image of a type of entity or type of characteristic, an identifier of the type of entity or type of characteristic, a sound associated with the type of entity or type of characteristic, and/or the like) and/or techniques for detecting the type of entity and/or the type characteristic of the entity, such as one or more object recognition techniques, facial recognition techniques, speech recognition techniques, character recognition techniques, and/or the like. The data stream analyzer may train the model using historical data associated with detecting types of entities and/or types of characteristics of the entities (e.g., using past analyses of the plurality of data streams or other data streams) and annotating the common knowledge graph (or other common knowledge graphs) with corresponding identified information associated with entities and/or characteristics of entities. Using the historical data and the one or more parameters and/or techniques for detecting the type of entity or type of characteristic (e.g., using the one or more parameters or techniques as inputs to the model to annotate the common knowledge graph), the data stream analyzer may detect that a type of entity (or a specific entity) and/or a type of characteristic (or a specific characteristic) of the entity is represented within the data stream.

Accordingly, the data stream analyzer may generate annotated knowledge graphs for the data streams using the common knowledge graph and information identified in the data streams. An example of annotating a common knowledge graph is described herein at least in connection with example implementation 200 in FIG. 2A.

As further shown in FIG. 1, and by reference number 140, the data stream analyzer compares the annotated knowledge graphs to identify possible entities that may have unrecognizable characteristics in one data stream but recognizable characteristics in another data stream. In such cases, the data stream analyzer may determine whether an entity is recognizable based on the annotated knowledge graphs. For example, if a characteristic, such as a name, of an entity is not annotated in one data stream (e.g., the name is unrecognizable from recognizable characteristics of the data stream) but the corresponding characteristic (the name) of the entity is annotated in another data stream, the data stream analyzer may determine that the recognizable characteristic corresponds to the entity. Therefore, the entity may be recognized using the recognizable characteristic by assigning the name to that entity in the one data stream.

In such cases, annotated knowledge graphs for entities identified in the plurality of data streams may be compared, such that recognizable and/or unrecognizable characteristics of the entities in the data streams can be compared to determine which of the entities are common to at least two or more of the plurality of data streams. Accordingly, those annotated knowledge graphs for entities that show more common characteristics may indicate a higher probability that the entities are the same entities than those entities in the annotated knowledge graphs that have fewer common characteristics.

According to some implementations, the data stream analyzer may determine a probability that an entity is a specific entity based on a comparison of the annotated knowledge graphs for the plurality of data streams. For example, the data stream analyzer may use a scoring system that may score identified entities in the plurality of data streams. The scoring system may apply certain weights to certain characteristics of entities of the common knowledge graph and/or the annotated knowledge graphs of the data streams. For example, a facial characteristic of a person may be weighted more heavily than a voice profile of a person (e.g., perhaps because a facial recognition technique that is used is more accurate than a voice recognition technique that is used), or a name of a person may be weight more heavily than the fact that the person is associate with a particular location (e.g., because that does not necessarily indicate that the person was at that location at when the data stream was captured), and/or the like. According to some implementations, the weights and/or scoring system may be adjustable and/or reconfigured using user input.

In some implementations, the data stream analyzer may use machine learning to train a model for determining a probability (or adjusting a scoring system associated with determining a probability) that an unrecognizable entity is a particular entity of another data stream. For example, the data stream analyzer may train the model to determine the probability that an entity is an unrecognizable entity of a data stream based on one or more parameters of another data stream that includes the entity and the data stream. The one or more parameters may include an image of the entity in the other data stream, a name of the entity in the other data stream, timing associated with the data stream and the presence of the entity in the other data stream, an association of the entity to an event of the data stream and an event of the other data stream, an identifier of the entity being mentioned in the data stream or the other data stream, a voice of the entity being detected in another data stream, a location associated with the data stream or the other data stream, and/or the like. The data stream analyzer may train the model using historical data associated with identifying probabilities that unrecognizable entities are recognizable entities (e.g., using past analyses of the plurality of data streams or other data streams). Using the historical data and the one or more parameters (e.g., using the one or more parameters as inputs to the model for identifying a probability that a specific entity is an unrecognizable entity), the data stream analyzer may determine a probability that an entity of a data stream is a specific entity recognized in another data stream.

In this way, the data stream analyzer may determine whether recognized entities in one or more data streams are unrecognizable entities in another data stream. An example of comparing annotated knowledge graphs to determine whether a recognized entity in one annotated knowledge graph is an unrecognizable entity in another annotated knowledge graph is described herein at least in connection with example implementation 200 in FIG. 2B.

As further shown in FIG. 1, and by reference number 150, the data stream analyzer determines metadata for the unrecognizable entity in the data stream. For example, the data stream analyzer may determine metadata that includes characteristics (e.g., a name, a voice, a face, and/or the like) from the recognizable entity in the annotated knowledge graph associated with the other data stream. Additionally, or alternatively, the metadata may include a probability that a recognizable entity in the other data stream is the unrecognizable entity of the data stream. The probability may correspond to whether the entity is recognizable based on the comparison of characteristics of entities in the annotated knowledge graphs, as described above.

In some implementations, the data stream analyzer may determine the metadata based on settings and/or a configuration of the data stream analyzer. The settings and/or configuration of the data stream analyzer may be set according to a user input and/or a default setting. In some implementations, the data stream analyzer may use machine learning to train a model for determining metadata associated with an unrecognizable entity of a data stream and/or recognizable entity of another stream. For example, the data stream analyzer may train the model to determine characteristics of an entity of the other data stream based on one or more parameters (e.g., the type of characteristic, the number of similar characteristics, whether the characteristics are recognizable or unrecognizable characteristics, and/or the like). The data stream analyzer may train the model using historical data associated with determining metadata for the unrecognizable entity of the data stream (e.g., using past analyses of the plurality of data streams or other data streams). Using the historical data and the one or more parameters determining the metadata (e.g., using the one or more parameters as inputs to the model for determining the metadata), the data stream analyzer may determine the metadata and/or select how the metadata is to be provided in association with the data stream.

In this way, the data stream analyzer may determine what metadata is to be provided, appended, and/or supplemented within and/or in association with a data stream. As such, the metadata may indicate missing information associated with an unrecognizable entity within the data stream and/or recognize the entity within the data stream. For example, the metadata may cause information (e.g., identification information) to be overlaid on an image to identify the entity, may replace unrecognizable characteristics with recognizable characteristics of the entities, and/or the like.

As further shown in FIG. 1, and by reference number 160, the data stream analyzer provides an output indicating metadata associated with the unrecognizable entity. As shown in FIG. 1, the data stream analyzer may provide a probability (e.g., 91%) that the unrecognizable entity from the data stream is Paul, age 50. Additionally, or alternatively, the data stream analyzer may indicate a probability that the entity is recognizable (e.g., as any entity associated with the plurality of data streams) within the metadata. The metadata may be appended to the data stream, stored in association with the data stream, and/or stored in a data structure associated with the data stream. According to some implementations, the metadata may be provided to a user (e.g., via a user interface), may be appended to the data stream, may be embedded within the data stream (e.g., by including the name of the entity within the video stream of FIG. 1), and/or the like.

In some implementations, the data stream analyzer may provide a plurality of profiles, indicating probabilities that other entities may be the unrecognizable entity (e.g., other entities that are associated or included within the plurality of data streams received by the data stream analyzer). For example, when the probability that more than one entity may correspond to the unrecognizable entity of the data stream satisfies a threshold, then the metadata may include information corresponding to both of the entities (and the corresponding probabilities for the entities). Accordingly, a user may identify the entity from the information in each of the plurality of profiles and/or perform a further analysis based on the information provided in the plurality of profiles.

In some implementations, for example, when the probability that an entity corresponds to the unrecognizable entity in the data stream satisfies a threshold (e.g., 98% likelihood, 90% likelihood, 80% likelihood, and/or the like), the data stream analyzer may supplement data and/or characteristics of the unrecognizable characteristic of the unrecognizable entity with recognizable characteristic from the other data stream. Additionally, or alternatively, the data stream analyzer may reconstruct a data stream to replace an unrecognizable characteristic of an entity with a recognizable characteristic of the entity. As a specific example, if the data stream is a text stream, the data stream analyzer may replace pronouns referring to an entity in the text stream with a name of the entity determined from another data stream. In some implementations, the reconstructed data stream can be stored in place of the original data stream and/or in association with the original data stream.

Accordingly, the data stream analyzer may perform an action associated with determining that an unrecognizable entity in a data stream is an entity or may be an entity recognized in another data stream. The data stream analyzer may provide metadata associated with the entity or entities recognized in the other data stream.

Accordingly, as described herein in connection with example implementation 100 of FIG. 1, the data stream analyzer may use a plurality of data streams to recognize one or more entities and/or one or more corresponding characteristics of the one or more entities. As such, if one of the plurality of data streams is missing information and/or includes an unrecognizable entity, at least one of the remaining data streams of the plurality of data streams may be used to supplement and/or provide information associated with the missing information and/or unrecognizable entity. Therefore, the entity and/or the data stream can be accurately classified and/or categorized as including information associated with a specific entity or as having a probability that the specific entity is represented within the data stream.

As indicated above, FIG. 1 is provided merely as an example. Other examples are possible and may differ from what was described with regard to FIG. 1.

Figure 2A:
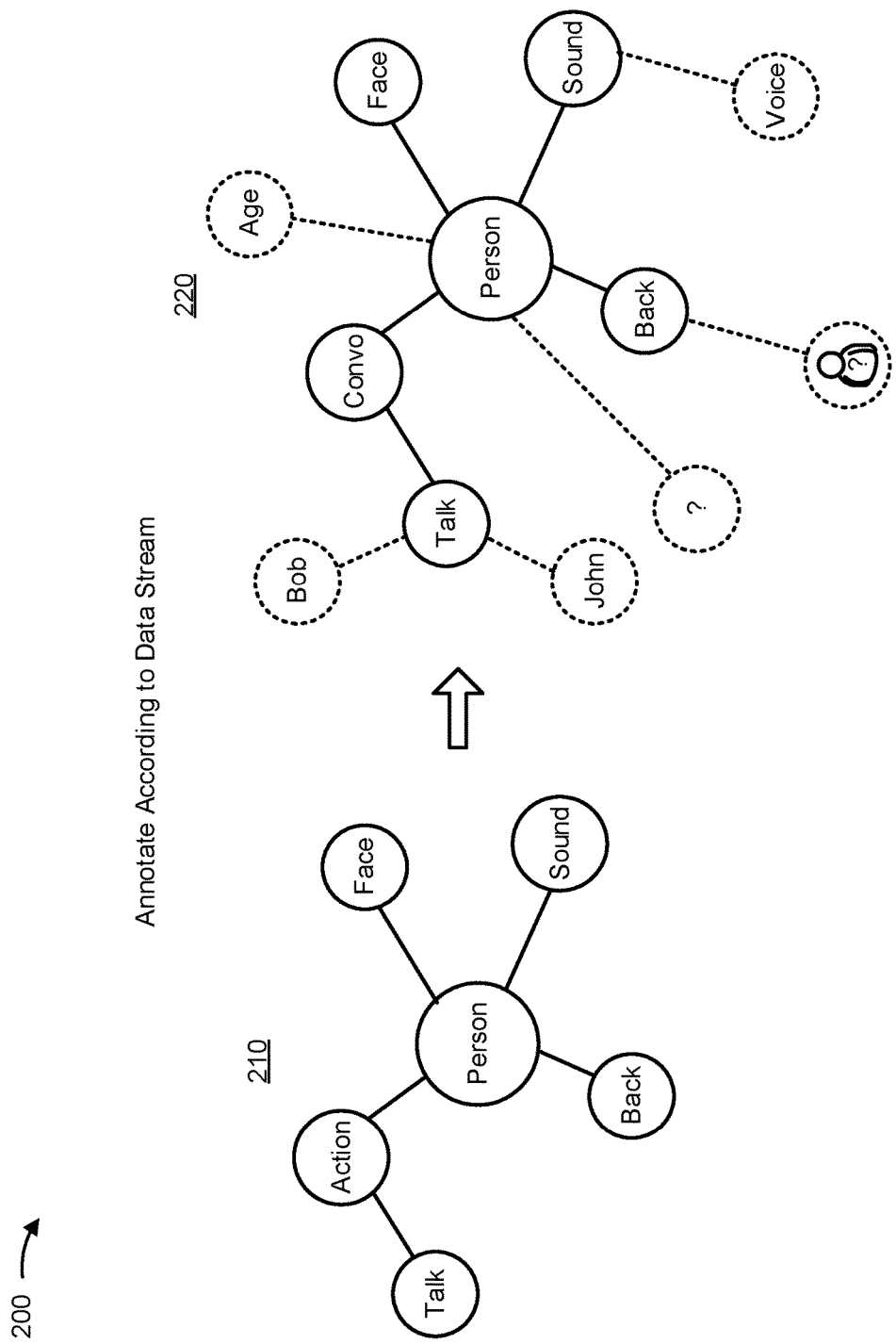
FIGS. 2A and 2B are diagrams of an example implementation described herein.
Figure 2B:
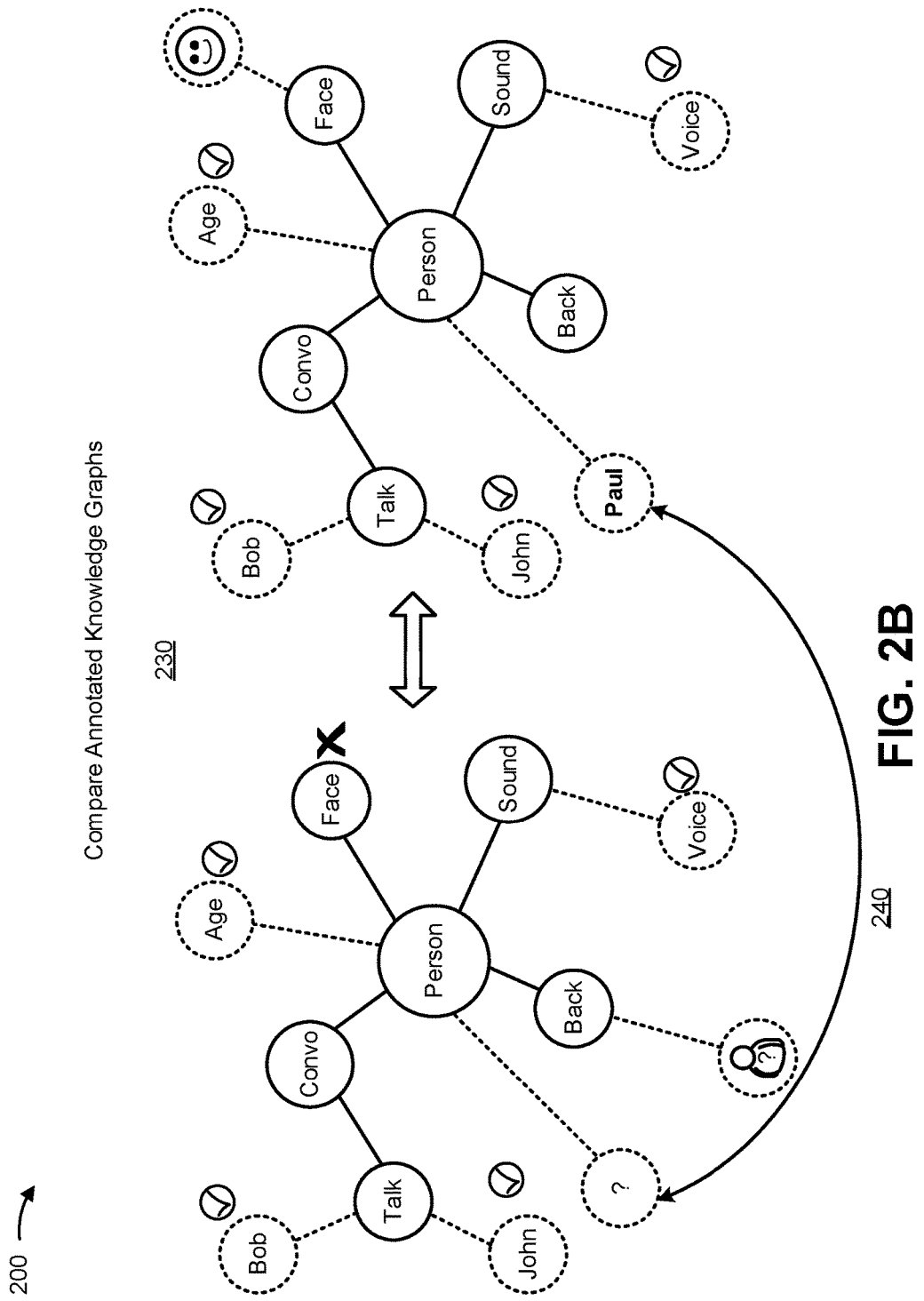

FIGS. 2A and 2B are diagrams of an example implementation 200 described herein. As shown in example implementation 200, a common knowledge graph can be annotated for one data stream to generate an annotated knowledge graph for the one data stream. The annotated knowledge graph can be compared to another annotated knowledge graph for another data stream to recognize an entity and/or recognizable characteristics of the entity in the other data stream that correspond to unrecognizable characteristics of the entity in the one data stream.

As shown in FIG. 2A, and by reference number 210, a common knowledge graph of a person is identified. For example, a data analysis technique (e.g., an objection recognition technique, a person recognition technique, and/or the like) used to analyze the one data stream may determine that a person is present with the one data stream. Accordingly, the data stream analyzer may obtain the common knowledge graph for a person. As shown in the example implementation, the common knowledge graph may include "person" as an internal node and characteristics of a person in nodes connected to the internal node. In FIG. 2A, such example characteristics may include that the person has a "face," is associated with a "sound" (e.g., a voice), has a "back," and can perform an "action" (e.g., "talk").

As further shown in FIG. 2A, and by reference number 220, when a person is detected in the one data stream (though the person may be unrecognizable), the data stream analyzer may annotate the common knowledge graph with recognizable information from the one data stream. For example, as shown by the dotted lines, the person in the one data stream may have a known age, a back (which can be annotated with data associated with the person's back and/or annotated to indicate that the person's back is present within the data stream), that the person has a particular voice, and that the person is talking with Bob and John. As shown, an unrecognizable characteristic, such as the identity of the person, is indicated in the knowledge graph.

As shown in FIG. 2B, and by reference number 230, the annotated knowledge graph for the one data stream is compared to an annotated knowledge graph for another data stream. For example, such a comparison shows that the annotated knowledge graphs both indicate that the person has a same age, that the person is talking to Bob and John, and that the person has a same voice. Accordingly, despite the person from the one data stream being unrecognizable (e.g., because a face is not detectable or a name is not detectable), the data stream analyzer may use information from the annotated knowledge graph for another data stream to determine the identity (e.g., Paul) of the person in the one data stream. As such, as shown by reference number 240, the identity of the person in the one data stream can be determined to be Paul. Additionally, or alternatively, a probability of that the identity of the person in the one data stream is Paul can be calculated, as described herein (e.g., based on which characteristics of the annotated knowledge graphs match one another, which characteristics do not match one another, and/or which characteristics are unrecognizable in the annotated knowledge graphs).

Accordingly, as described herein, the data stream analyzer may use a common knowledge graph and one or more annotated knowledge graphs (that are generated from the common knowledge graph and information from a corresponding data stream) may be used to identify an unrecognizable entity within a data stream using information from another data stream.

As indicated above, FIGS. 2A and 2B are provided merely as an example. Other examples are possible and may differ from what was described with regard to FIGS. 2A and 2B.

Figure 3:
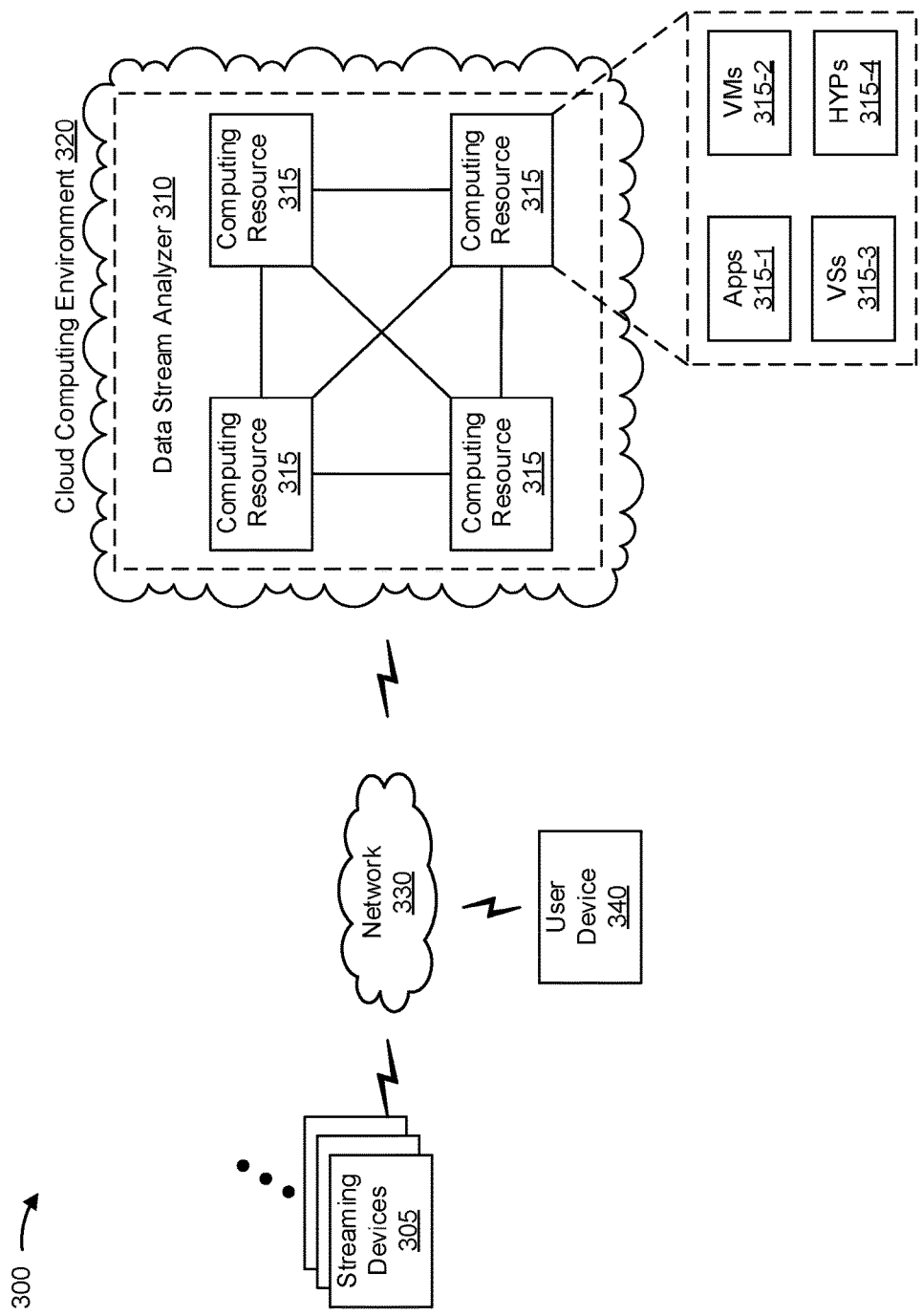
FIG. 3 is a diagram of an example environment in which systems and/or methods, described herein, may be implemented.

FIG. 3 is a diagram of an example environment 300 in which systems and/or methods, described herein, may be implemented. As shown in FIG. 3, environment 300 may include streaming devices 305 (which may be referred to individually as "streaming device 305" or collectively as "streaming devices 305"), a data stream analyzer 310, a computing resource 315, a cloud computing environment 320, a network 330, and a user device 340. Devices of environment 300 may interconnect via wired connections, wireless connections, or a combination of wired and wireless connections.

Streaming device 305 includes one or more devices capable of obtaining, generating, storing, processing, and/or providing information associated with a data stream. For example, streaming device 305 may include a user device (e.g., a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), and/or the like), a camera, a microphone, a transcription device (e.g., a device with speech to text capability), a sensor device, an IoT device, and/or the like. Streaming device 305 may be used to identify one or more entities associated with a particular event, at a particular location, associated with a particular person or entity, associated with a particular time period, and/or the like.

Data stream analyzer 310 includes one or more computing resources or devices capable of receiving, generating, storing, processing, and/or providing information associated with recognizing an entity using multiple data streams to supplement missing information associated with the entity. For example, data stream analyzer 310 may correspond to the data stream analyzer described in connection with FIGS. 1, 2A, and/or 2B. In some implementations, data stream analyzer 310 may be a platform implemented by cloud computing environment 320 that may determine that an entity is unrecognizable in one data stream and use information from another data stream to recognize the entity and/or supplement missing information in the one data stream with corresponding information identified in the other data stream. In some implementations, data stream analyzer 310 is implemented by computing resources 315 of cloud computing environment 320.

Data stream analyzer 310 may include a server device or a group of server devices. In some implementations, data stream analyzer 310 may be hosted in cloud computing environment 320. Notably, while implementations described herein describe data stream analyzer 310 as being hosted in cloud computing environment 320, in some implementations, data stream analyzer 310 may not be cloud-based or may be partially cloud-based.

Cloud computing environment 320 includes an environment that delivers computing as a service, whereby shared resources, services, etc. may be provided to a user device. Cloud computing environment 320 may provide computation, software, data access, storage, and/or other services that do not require end-user knowledge of a physical location and configuration of a system and/or a device that delivers the services. As shown, cloud computing environment 320 may include data stream analyzer 310 and computing resource 315.

Computing resource 315 includes one or more personal computers, workstation computers, server devices, or another type of computation and/or communication device. In some implementations, computing resource 315 may host data stream analyzer 310. The cloud resources may include compute instances executing in computing resource 315, storage devices provided in computing resource 315, data transfer devices provided by computing resource 315, etc. In some implementations, computing resource 315 may communicate with other computing resources 315 via wired connections, wireless connections, or a combination of wired and wireless connections.

As further shown in FIG. 3, computing resource 315 may include a group of cloud resources, such as one or more applications ("APPs") 315-1, one or more virtual machines ("VMs") 315-2, virtualized storage ("VSs") 315-3, one or more hypervisors ("HYPs") 315-4, or the like.

Application 315-1 includes one or more software applications that may be provided to or accessed by streaming devices 305. Application 315-1 may eliminate a need to install and execute the software applications on streaming devices 305. For example, application 315-1 may include software associated with data stream analyzer 310 and/or any other software capable of being provided via cloud computing environment 320. In some implementations, one application 315-1 may send/receive information to/from one or more other applications 315-1, via virtual machine 315-2.

Virtual machine 315-2 includes a software implementation of a machine (e.g., a computer) that executes programs like a physical machine. Virtual machine 315-2 may be either a system virtual machine or a process virtual machine, depending upon use and degree of correspondence to any real machine by virtual machine 315-2. A system virtual machine may provide a complete system platform that supports execution of a complete operating system ("OS"). A process virtual machine may execute a single program, and may support a single process. In some implementations, virtual machine 315-2 may execute on behalf of a user (e.g., streaming devices 305), and may manage infrastructure of cloud computing environment 320, such as data management, synchronization, or long-duration data transfers.

Virtualized storage 315-3 includes one or more storage systems and/or one or more devices that use virtualization techniques within the storage systems or devices of computing resource 315. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 315-4 provides hardware virtualization techniques that allow multiple operating systems (e.g., "guest operating systems") to execute concurrently on a host computer, such as computing resource 315. Hypervisor 315-4 may present a virtual operating platform to the guest operating systems, and may manage the execution of the guest operating systems. Multiple instances of a variety of operating systems may share virtualized hardware resources.

Network 330 includes one or more wired and/or wireless networks. For example, network 330 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

User device 340 includes one or more devices capable of receiving, generating, storing, processing, and/or providing information associated with analyzing one or more data streams (e.g., to detect entities within the data streams). For example, user device 340 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
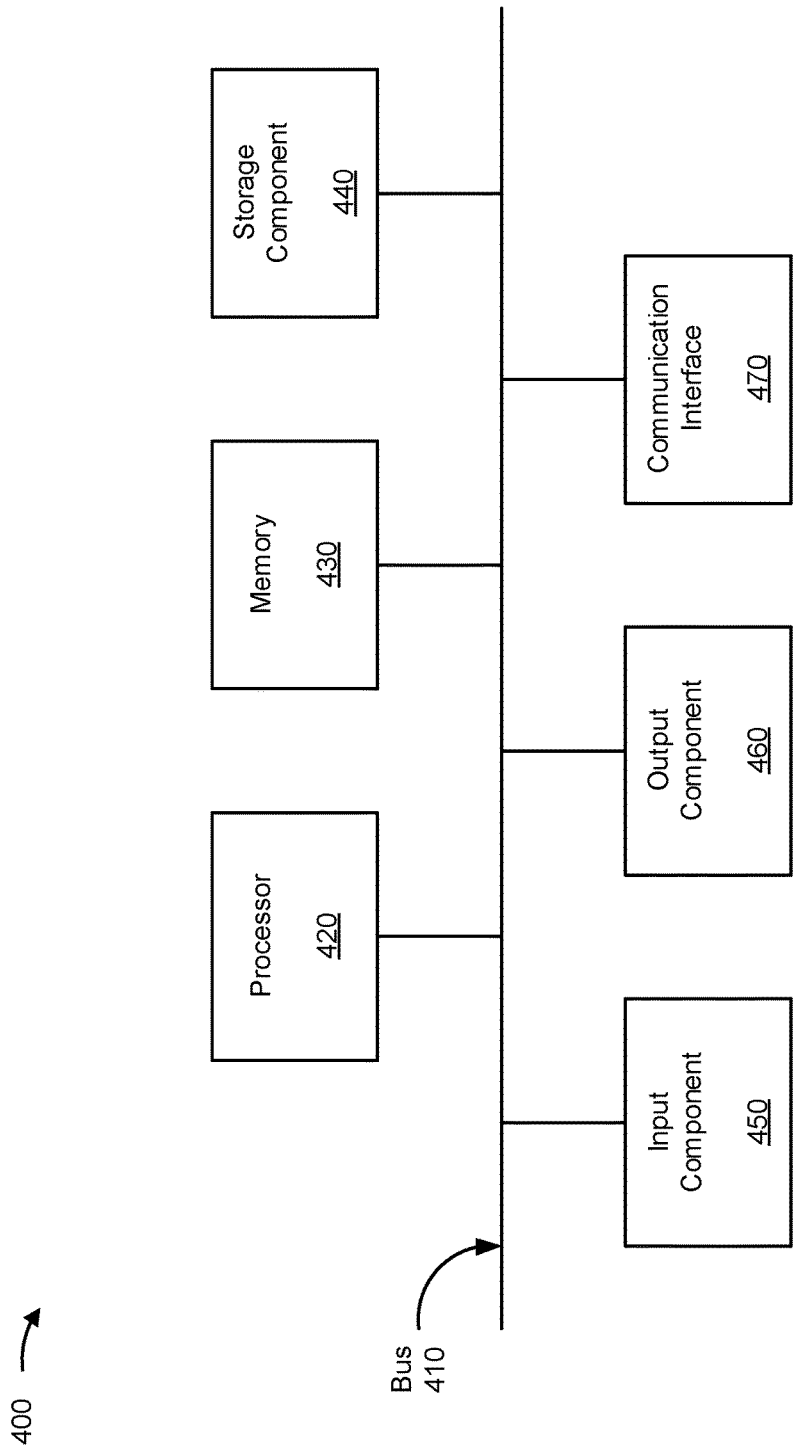
FIG. 4 is a diagram of example components of one or more devices of FIG. 3.

FIG. 4 is a diagram of example components of a device 400. Device 400 may correspond to streaming device 305, data stream analyzer 310, computing resource 315, and/or user device 340. In some implementations, streaming device 305, data stream analyzer 310, computing resource 315, and/or user device 340 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes based on to processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
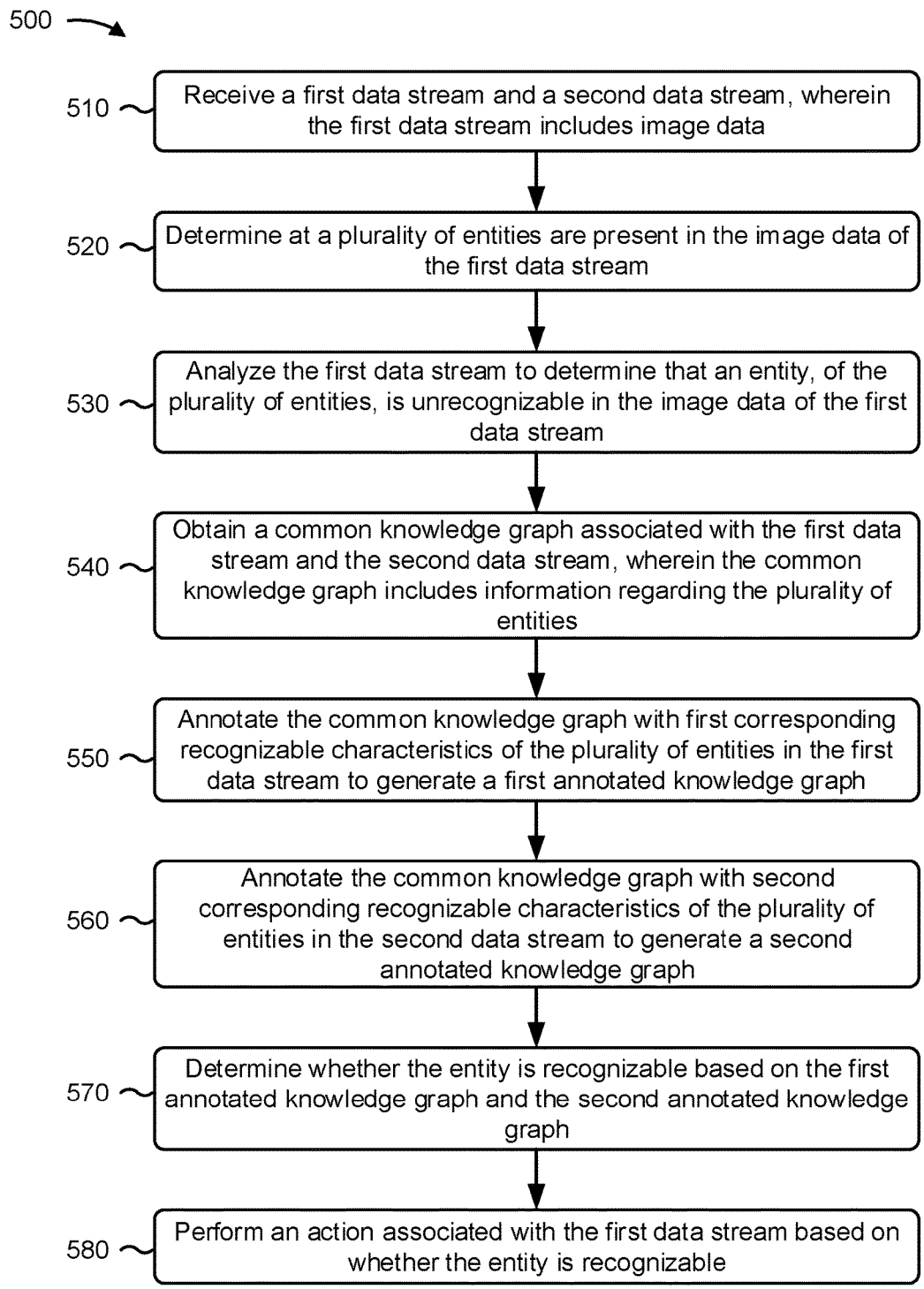
FIGS. 5-7 are flow charts of example processes for recognizing an entity using multiple data streams to supplement missing information associated with the entity.

FIG. 5 is a flow chart of an example process 500 for recognizing an entity using multiple data streams to supplement missing information associated with the entity. In some implementations, one or more process blocks of FIG. 5 may be performed by a data stream analyzer (e.g., data stream analyzer 310). In some implementations, one or more process blocks of FIG. 5 may be performed by another device or a group of devices separate from or including data stream analyzer (e.g., data stream analyzer 310), such as a streaming device (e.g., streaming devices 305), and/or a user device (e.g., user device 340).

As shown in FIG. 5, process 500 may include receiving a first data stream and a second data stream (block 510). For example, data stream analyzer (e.g., using computing resource 315, processor 420, input component 450, communication interface 470, and/or the like) may receive a first data stream and a second data stream.

As further shown in FIG. 5, process 500 may include determining that a plurality of entities are present in the image data of the first data stream (block 520). For example, data stream analyzer (e.g., using computing resource 315, processor 420, input component 450, and/or the like) may determine that a plurality of entities are present in the image data of the first stream.

As further shown in FIG. 5, process 500 may include analyzing the first data stream to determine that an entity, of the plurality of entities, is unrecognizable in the image data of the first data stream (block 530). For example, data stream analyzer (e.g., using computing resource 315, processor 420, and/or the like) may analyze the first data stream to determine that an entity, of the plurality of entities, is unrecognizable in the image data of the first data stream.

As further shown in FIG. 5, process 500 may include obtaining a common knowledge graph associated with the first data stream and the second data stream, wherein the common knowledge graph includes information regarding the plurality of entities (block 540). For example, data stream analyzer (e.g., using computing resource 315, processor 420, input component 450, communication interface 470, and/or the like) may obtain a common knowledge graph associated with the first data stream in the second data stream. In some implementations, the common knowledge graph includes information regarding the plurality of entities.

As further shown in FIG. 5, process 500 may include annotating the common knowledge graph with first corresponding recognizable characteristics of the plurality of entities in the first data stream to generate a first annotated knowledge graph (block 550). For example, data stream analyzer (e.g., using computing resource 315, processor 420, and/or the like) may annotate the common knowledge graph with first corresponding recognizable characteristics of the plurality of entities in the first data stream to generate a first annotated knowledge graph.

As further shown in FIG. 5, process 500 may include annotating the common knowledge graph with second corresponding recognizable characteristics of the plurality of entities in the second data stream to generate a second annotated knowledge graph (block 560). For example, data stream analyzer (e.g., using computing resource 315, processor 420, and/or the like) may annotate the common knowledge graph with second corresponding recognizable characteristics of the plurality of entities in the second data stream to generate a second annotated knowledge graph.

As further shown in FIG. 5, process 500 may include determining whether the entity is recognizable based on the first annotated knowledge graph and the second annotated knowledge graph (block 570). For example, data stream analyzer (e.g., using computing resource 315, processor 420, and/or the like) may determine whether the entity is recognizable based on the first annotated knowledge graph in the second annotated knowledge graph.

As further shown in FIG. 5, process 500 may include performing an action associated with the first data stream based on whether the entity is recognizable (block 580). For example, data stream analyzer (e.g., using computing resource 315, processor 420, output component 460, communication interface 470, and/or the like) may perform an action associated with the first data stream based on whether the entity is recognizable.

Process 500 may include additional implementations, such as any single implementation or any combination of implementations described below and/or in connection with one or more other processes described elsewhere herein.

In some implementations, the information regarding the plurality of entities indicates corresponding identities of one or more of the plurality of event. In some implementations, the data stream analyzer may determine that the entity is unrecognizable based on the image data looting and unrecognizable characteristic of the entity.

In some implementations, the data stream analyzer may determine the probability that the entity is recognizable based on comparing the first annotated knowledge graph in the second annotated knowledge graph. In some implementations, when performing the action, the data stream analyzer may indicate the probability that the entity is recognizable within metadata associated with the first data stream.

In some implementations, the data stream analyzer, when performing the action, may determine the probability that the entity is recognizable based on pairing the first annotated knowledge graph in the second annotated knowledge graph, determined that the probability satisfies a threshold, and supplement the first data stream to include a recognizable characteristic, from the second data stream, that corresponds to an unrecognizable characteristic of the entity based on the probability satisfying the threshold. In some implementations, the first data stream in the second data stream are associated with at least one of the same event, same location, same person, or a same time period.

In some implementations, the image data may include a first image data in the second data stream may include second image data. In some implementations, the second image data includes the second corresponding recognizable characteristics of the plurality of entities. In some implementations, the second data stream includes at least one of image data, audio data, text data, or sensor data.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
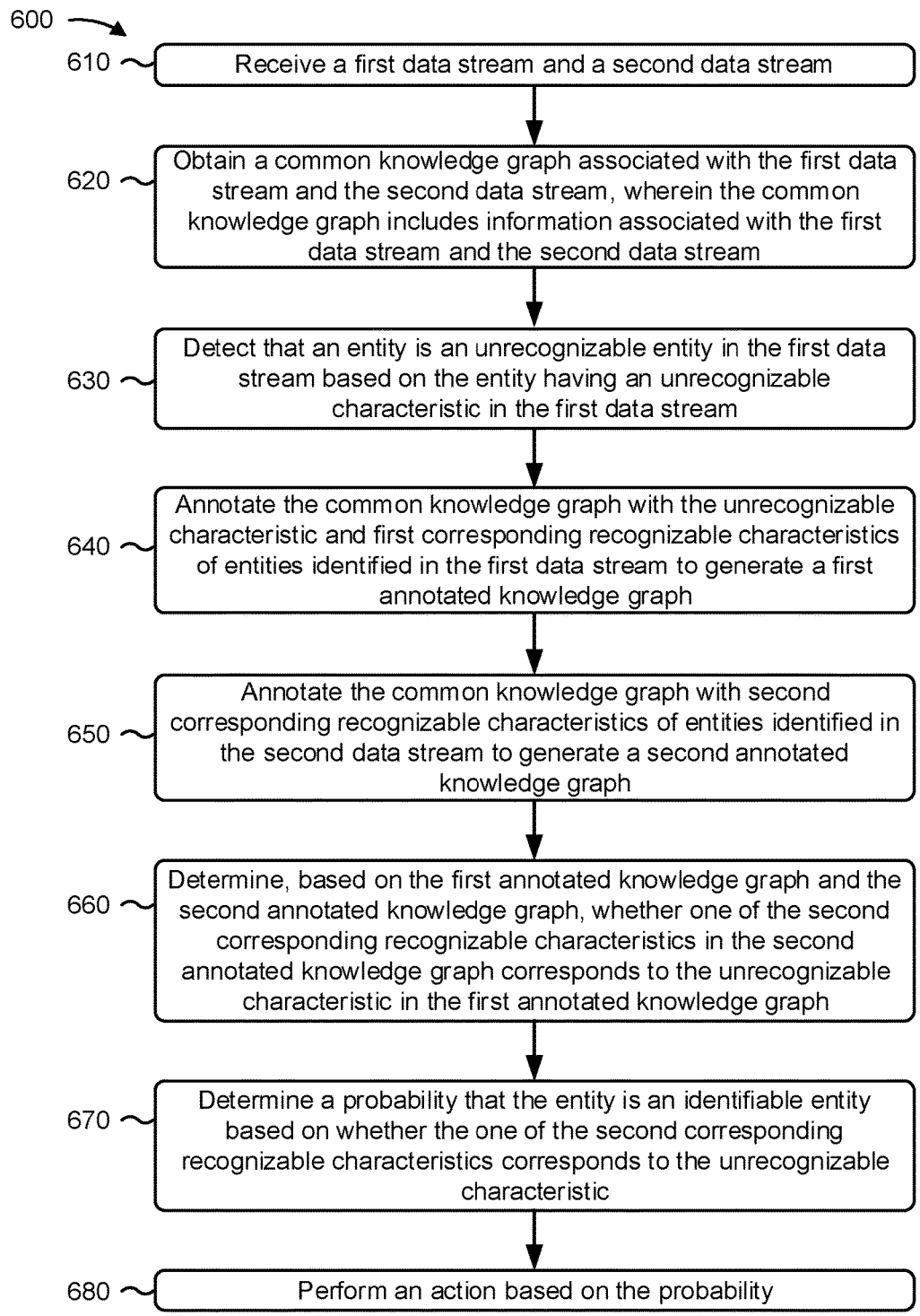

FIG. 6 is a flow chart of an example process 600 for recognizing an entity using multiple data streams to supplement missing information associated with the entity. In some implementations, one or more process blocks of FIG. 6 may be performed by a data stream analyzer (e.g., data stream analyzer 310). In some implementations, one or more process blocks of FIG. 6 may be performed by another device or a group of devices separate from or including data stream analyzer (e.g., data stream analyzer 310), such as a streaming device (e.g., streaming devices 305), and/or a user device (e.g., user device 340).

As shown in FIG. 6, process 600 may include receiving a first data stream and a second data stream (block 610). For example, data stream analyzer (e.g., using computing resource 315, processor 420, input component 450, communication interface 470, and/or the like) may receive a first data stream and a second data stream.

As further shown in FIG. 6, process 600 may include obtaining a common knowledge graph associated with the first data stream and the second data stream, wherein the common knowledge graph includes information associated with the first data stream and the second data stream (block 620). For example, data stream analyzer (e.g., using computing resource 315, processor 420, input component 450, communication interface 470, and/or the like) may obtain a Commons knowledge graph associated with the first data stream in the second data stream. In some implementations, the common knowledge graph includes information associated with the first data stream in the second data stream.

As further shown in FIG. 6, process 600 may include detecting that an entity is an unrecognizable entity in the first data stream based on the entity having an unrecognizable characteristic in the first data stream (block 630). For example, data stream analyzer (e.g., computing resource 315, using computing resource 315, processor 420, input component 450, and/or the like) may detect that an entity is an unrecognizable entity in the first data stream based on the entity having an unrecognizable characteristic in the first data stream.

As further shown in FIG. 6, process 600 may include annotating the common knowledge graph with the unrecognizable characteristic and first corresponding recognizable characteristics of entities identified in the first data stream to generate a first annotated knowledge graph (block 640). For example, data stream analyzer (e.g., using computing resource 315, processor 420, and/or the like) may annotate the common knowledge graph with the unrecognizable characteristic and first corresponding recognizable characteristics of entities identified in the first data stream to generate a first annotated knowledge graph.

As further shown in FIG. 6, process 600 may include annotating the common knowledge graph with second corresponding recognizable characteristics of entities identified in the second data stream to generate a second annotated knowledge graph (block 650). For example, data stream analyzer (e.g., using computing resource 315, processor 420, and/or the like) may annotate the common knowledge graph with second corresponding recognizable characteristics of entities identified in the second data stream to generate a second annotated knowledge graph.

As further shown in FIG. 6, process 600 may include determining, based on the first annotated knowledge graph and the second annotated knowledge graph, whether one of the second corresponding recognizable characteristics in the second annotated knowledge graph corresponds to the unrecognizable characteristic in the first annotated knowledge graph (block 660). For example, data stream analyzer (e.g., using computing resource 315, processor 420, and/or the like) may determine, based on the first annotated knowledge graph in the second annotated knowledge graph, whether one of the second corresponding recognizable characteristics in the second annotated knowledge graph corresponds to the unrecognizable characteristic in the first annotated knowledge graph.

As further shown in FIG. 6, process 600 may include determining a probability that the entity is an identifiable entity based on whether the one of the second corresponding recognizable characteristics corresponds to the unrecognizable characteristic (block 670). For example, data stream analyzer (e.g., using computing resource 315, processor 420, and/or the like) may determine a probability that the entity is an identifiable entity based on whether the one of the second corresponding recognizable characteristics corresponds to the unrecognizable characteristic.

As further shown in FIG. 6, process 600 may include performing an action based on the probability (block 680). For example, data stream analyzer (e.g., using computing resource 315, processor 420, output component 460, communication interface 470, and/or the like) may perform an action based on the probability.

Process 600 may include additional implementations, such as any single implementation or any combination of implementations described below and/or in connection with one or more other processes described elsewhere herein.

In some implementations, the common knowledge graph is associated with at least one of an event of location a person or a time. That is monitored by one or more data stream devices providing the first data stream. In some implementations, the common knowledge graph indicates that the entity is included in the first data stream and the second data stream.

In some implementations, the data stream analyzer, when annotating the common knowledge graph to generate the first annotated knowledge graph, may analyze the first data stream using a first object recognition technique to identify the first corresponding recognizable characteristics of the entities identified in the first data stream, associate the first corresponding recognizable characteristics with corresponding nodes of the common knowledge graph to generate the first annotated knowledge graph, and indicate that the unrecognizable characteristic is associated with a particular note of the common knowledge graph that corresponds to the unrecognizable characteristic. In some implementations, the first object recognition technique is associated with a first type of the first data stream. In some implementations, the data stream analyzer, when annotating the common knowledge graph to generate the second annotated knowledge graph may analyze the second data stream using a second object recognition technique to identify the second corresponding recognizable characteristics of the entities identified in the second data stream and associate the second corresponding recognizable characteristics with corresponding nodes of the common knowledge graph to generate the second annotated knowledge graph. In some implementations the second object recognition technique is associated with the second type of the second data stream.

In some implementations, the first data stream is an originally received first data stream and the data stream analyzer, when performing the action, may reconstruct the originally received first data stream by replacing data associated with the unrecognizable characteristic with data associated with the recognizable characteristic to create a reconstructed first data stream and store the reconstructed first data stream in association with the originally received first data stream. In some implementations, the data stream analyzer, when performing the action, may supplement the first data stream with metadata, associated with the one of the second corresponding recognizable characteristics, based on the one of the second corresponding recognizable characteristics corresponding to the unrecognizable characteristic.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
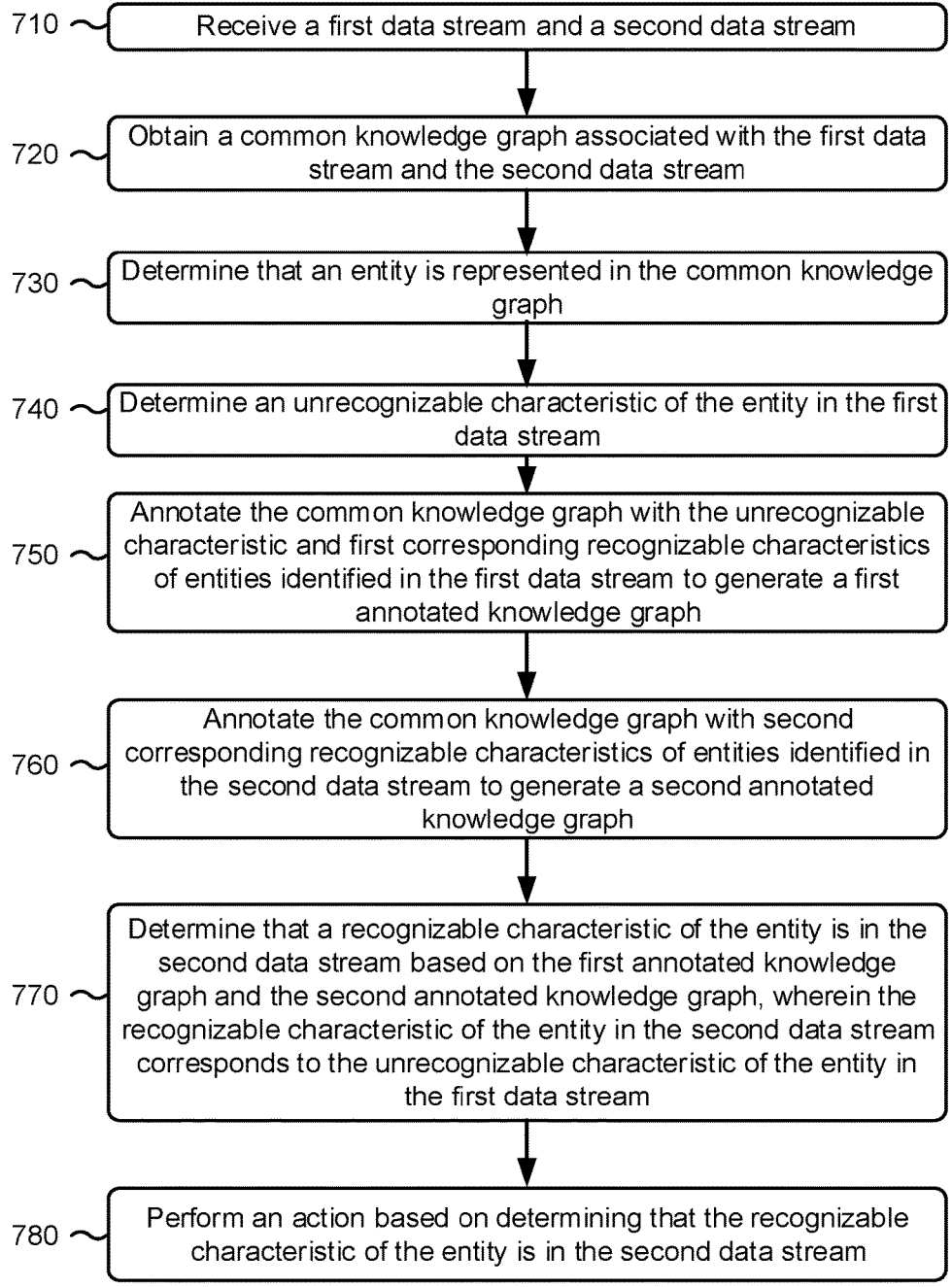

FIG. 7 is a flow chart of an example process 700 for recognizing an entity using multiple data streams to supplement missing information associated with the entity. In some implementations, one or more process blocks of FIG. 7 may be performed by a data stream analyzer (e.g., data stream analyzer 310). In some implementations, one or more process blocks of FIG. 7 may be performed by another device or a group of devices separate from or including data stream analyzer (e.g., data stream analyzer 310), such as a streaming device (e.g., streaming devices 305), and/or a user device (e.g., user device 340).

As shown in FIG. 7, process 700 may include receiving a first data stream and a second data stream (block 710). For example, data stream analyzer (e.g., using computing resource 315, processor 420, input component 450, communication interface 470, and/or the like) may receive a first data stream and a second data stream.

As further shown in FIG. 7, process 700 may include obtaining a common knowledge graph associated with the first data stream and the second data stream (block 720). For example, data stream analyzer (e.g., using computing resource 315, processor 420, input component 450, communication interface 470, and/or the like) may obtain a common knowledge graph associated with the first data stream in the second date stream.

As further shown in FIG. 7, process 700 may include determining that an entity is represented in the common knowledge graph (block 730). For example, data stream analyzer (e.g., using computing resource 315, processor 420, and/or the like) may determine that an entity is represented in the common knowledge graph.

As further shown in FIG. 7, process 700 may include determining an unrecognizable characteristic of the entity in the first data stream (block 740). For example, data stream analyzer (e.g., using computing resource 315, processor 420, and/or the like) may determine an unrecognizable characteristic of the entity in the first data stream.

As further shown in FIG. 7, process 700 may include annotating the common knowledge graph with the unrecognizable characteristic and first corresponding recognizable characteristics of entities identified in the first data stream to generate a first annotated knowledge graph (block 750). For example, data stream analyzer (e.g., using computing resource 315, processor 420, and/or the like) may annotate the common knowledge graph with the unrecognizable characteristic and first corresponding recognizable characteristics of entities identified in the first data stream to generate a first annotated knowledge graph.

As further shown in FIG. 7, process 700 may include annotating the common knowledge graph with second corresponding recognizable characteristics of entities identified in the second data stream to generate a second annotated knowledge graph (block 760). For example, data stream analyzer (e.g., using computing resource 315, processor 420, and/or the like) may annotate the common knowledge graph of second corresponding recognizable characteristics of entities identified in the second data stream to generate a second annotated knowledge graph.

As further shown in FIG. 7, process 700 may include determining that a recognizable characteristic of the entity is in the second data stream based on the first annotated knowledge graph and the second annotated knowledge graph, wherein the recognizable characteristic of the entity in the second data stream corresponds to the unrecognizable characteristic of the entity in the first data stream (block 770). For example, data stream analyzer (e.g., using computing resource 315, processor 420, and/or the like) may determine that a recognizable characteristic of the entity is in the second data stream based on the first annotated knowledge graph and the second annotated knowledge graph. In some implementations, the recognizable characteristic of the entity in the second data stream corresponds to the unrecognizable characteristic of the T in the first data stream.

As further shown in FIG. 7, process 700 may include performing an action based on determining that the recognizable characteristic of the entity is in the second data stream (block 780). For example, data stream analyzer (e.g., using computing resource 315, processor 420, output component 460, communication interface 470, and/or the like) may perform an action based on determining that the recognizable characteristic of the entity is in the second data stream.

Process 700 may include additional implementations, such as any single implementation or any combination of implementations described below and/or in connection with one or more other processes described elsewhere herein.

In some implementations, the first data stream is associated with a different time. In the second data stream. In some implementations, the first data stream in the second data stream are different types of data streams. In some implementations, the data stream analyzer, when performing the action, may determine a probability that the unrecognizable characteristic is associated with the entity based on comparing the first annotated knowledge graph and the second name annotated knowledge graph, determined that the probability satisfies a threshold, and supplement the first data stream to include the recognizable characteristic based on the probability satisfying the threshold.

In some implementations, the first data stream is an originally received first data stream. In some implementations, the data stream analyzer, when performing the action, may reconstruct the originally received first data stream by replacing data associated with the unrecognizable characteristic with data associated with the recognizable characteristic to create a reconstructed first data stream, and provide a notification that the entity is identified in the reconstructed first data stream. In some implementations, the data stream analyzer, when performing the action, may supplement the first data stream with metadata, associated with the recognizable characteristic, based on the recognizable characteristic corresponding to the unrecognizable characteristic.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Accordingly, as described herein, data stream analyzer 310 may automatically recognize one or more entities that are unrecognizable in a first data stream using information and/or analysis of other data streams that are associated with the first data stream. As such, data stream analyzer 310 may be used to categorize and/or provide information associated with a data stream to indicate the presence of one or more entities within a data stream, that according to previous techniques, could not be recognized. As such, some implementations described herein enable proper analysis of a data stream and/or use of a data stream in classification purposes, data analyses, and/or the like. Accordingly, as described herein, processor resources, memory resources, and/or the like that are wasted in association with mis-recognizing an entity and/or incorrectly categorizing a data stream as not including a particular entity can be conserved.

The example implementations provided herein, that are associated with recognizing one or more individuals may be capable through a previous agreement with the one or more individuals. For example, in a business setting, one or more individuals (e.g., employees) may consent to be recognized via monitoring devices within the business, such as within a meeting room.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, a first data stream and a second data stream;
   determining, by the device, that a plurality of entities are present in image data of the first data stream based on applying an object recognition technique to the image data;
   analyzing, by the device, the first data stream to determine that an entity, of the plurality of entities, is unrecognizable in the image data of the first data stream based on a facial recognition technique not detecting a face of the entity;
   obtaining, by the device, a common knowledge graph associated with the first data stream and the second data stream,
      wherein the common knowledge graph includes information regarding the plurality of entities;
   annotating, by the device, the common knowledge graph with first corresponding recognizable characteristics of the plurality of entities in the first data stream to generate a first annotated knowledge graph;
   annotating, by the device, the common knowledge graph with second corresponding recognizable characteristics of the plurality of entities in the second data stream to generate a second annotated knowledge graph;
   determining, by the device, whether the entity is recognizable based on the first annotated knowledge graph and the second annotated knowledge graph;

generating, by the device, metadata for the entity based on the first annotated knowledge graph and the second annotated knowledge graph; and appending, by the device, the metadata to the first data stream to at least one of:

overlay information for the entity on the image data of the first data stream, or replace an unrecognizable characteristic of the entity with a recognizable characteristic of the entity.

2. The method of claim 1, wherein the information regarding the plurality of entities indicates corresponding identities of one or more of the plurality of entities.

3. The method of claim 1, further comprising:
determining that the entity is unrecognizable based on the image data including the unrecognizable characteristic of the entity.

4. The method of claim 1, further comprising:
determining a probability that the entity is recognizable based on comparing the first annotated knowledge graph and the second annotated knowledge graph; and indicating the probability that the entity is recognizable within the metadata associated with the first data stream.

5. The method of claim 1, further comprising:
determining a probability that the entity is recognizable based on comparing the first annotated knowledge graph and the second annotated knowledge graph;

determining that the probability satisfies a threshold; and supplementing the first data stream to include a recognizable characteristic, from the second data stream, that corresponds to the unrecognizable characteristic of the entity based on the probability satisfying the threshold.

6. The method of claim 1, wherein the first data stream and the second data stream are associated with at least one of a same event, a same location, a same person, or a same time period.

7. The method of claim 1, wherein the image data comprises first image data and the second data stream includes second image data, wherein the second image data includes the second corresponding recognizable characteristics of the plurality of entities.

8. The method of claim 1, wherein the second data stream includes at least one of image data, audio data, text data, or sensor data.

9. A device, comprising:
one or more memories; and
one or more processors, communicatively coupled to the one or more memories, to:

receive a first data stream and a second data stream;

obtain a common knowledge graph associated with the first data stream and the second data stream, wherein the common knowledge graph includes information associated with the first data stream and the second data stream;

detect that an entity is an unrecognizable entity in the first data stream based on the entity having an unrecognizable characteristic in the first data stream, the unrecognizable characteristic being identified based on a facial recognition technique not detecting a face of the entity;

annotate the common knowledge graph with the unrecognizable characteristic and first corresponding recognizable characteristics of entities identified in the first data stream to generate a first annotated knowledge graph;

annotate the common knowledge graph with second corresponding recognizable characteristics of entities identified in the second data stream to generate a second annotated knowledge graph;

determine, based on the first annotated knowledge graph and the second annotated knowledge graph, whether one of the second corresponding recognizable characteristics in the second annotated knowledge graph corresponds to the unrecognizable characteristic in the first annotated knowledge graph;

determine a probability that the entity is an identifiable entity based on whether the one of the second corresponding recognizable characteristics corresponds to the unrecognizable characteristic;

generate metadata for the entity based on the probability; and append the metadata to the first data stream to at least one of:

overlay information for the entity on image data of the first data stream, or replace an unrecognizable characteristic of the entity with a recognizable characteristic of the entity.

10. The device of claim 9, wherein the common knowledge graph is associated with at least of an event, a location, a person, or a time period that is monitored by one or more data stream devices providing the first data stream.

11. The device of claim 9, wherein the common knowledge graph indicates that the entity is included in the first data stream and the second data stream.

12. The device of claim 9, wherein the one or more processors, when annotating the common knowledge graph to generate the first annotated knowledge graph, are to:

analyze the first data stream using a first object recognition technique to identify the first corresponding recognizable characteristics of the entities identified in the first data stream, wherein the first object recognition technique is associated with a first type of the first data stream, associate the first corresponding recognizable characteristics with corresponding nodes of the common knowledge graph to generate the first annotated knowledge graph, and indicate that the unrecognizable characteristic is associated with a particular node of the common knowledge graph that corresponds to the unrecognizable characteristic; and wherein the one or more processors, when annotating the common knowledge graph to generate the second annotated knowledge graph are to:

analyze the second data stream using a second object recognition technique to identify the second corresponding recognizable characteristics of the entities identified in the second data stream, wherein the second object recognition technique is associated with a second type of the second data stream; and associate the second corresponding recognizable characteristics with corresponding nodes of the common knowledge graph to generate the second annotated knowledge graph.

13. The device of claim 9, wherein the first data stream is an originally received first data stream and the one or more processors are further to:

reconstruct the originally received first data stream by replacing data associated with the unrecognizable characteristic with data associated with a recognizable characteristic, of the second corresponding recognizable characteristics, to create a reconstructed first data stream; and store the reconstructed first data stream in association with the originally received first data stream.

14. The device of claim 9, wherein the one or more processors are further to:

supplement the first data stream with metadata, associated with the one of the second corresponding recognizable characteristics, based on the one of the second corresponding recognizable characteristics corresponding to the unrecognizable characteristic.

15. A non-transitory computer-readable medium storing instructions, the instructions comprising:

one or more instructions that, when executed by one or more processors, cause the one or more processors to:
receive a first data stream and a second data stream;
obtain a common knowledge graph associated with the first data stream and the second data stream;
determine that an entity is represented in the common knowledge graph;
determine an unrecognizable characteristic of the entity in the first data stream based on a facial recognition technique not detecting a face of the entity;
annotate the common knowledge graph with the unrecognizable characteristic and first corresponding recognizable characteristics of entities identified in the first data stream to generate a first annotated knowledge graph;
annotate the common knowledge graph with second corresponding recognizable characteristics of entities identified in the second data stream to generate a second annotated knowledge graph;
determine that a recognizable characteristic of the entity is in the second data stream based on the first annotated knowledge graph and the second annotated knowledge graph,
wherein the recognizable characteristic of the entity in the second data stream corresponds to the unrecognizable characteristic of the entity in the first data stream;
generate metadata for the entity based on the first annotated knowledge graph and the second annotated knowledge graph; and append the metadata to the first data stream to at least one of:
overlay information for the entity on image data of the first data stream, or
replace an unrecognizable characteristic of the entity with the recognizable characteristic of the entity.

16. The non-transitory computer-readable medium of claim 15, wherein the first data stream is associated with a different time period than the second data stream.

17. The non-transitory computer-readable medium of claim 15, wherein the first data stream and the second data stream are different types of data streams.

18. The non-transitory computer-readable medium of claim 15, wherein the one or more instructions, when executed by the one or more processors, further cause the one or more processors to:

determine a probability that the unrecognizable characteristic is associated with the entity based on comparing the first annotated knowledge graph and the second annotated knowledge graph;
determine that the probability satisfies a threshold; and
supplement the first data stream to include the recognizable characteristic based on the probability satisfying the threshold.

19. The non-transitory computer-readable medium of claim 15, wherein the first data stream is an originally received first data stream and wherein the one or more instructions, when executed by the one or more processors, further cause the one or more processors to:

reconstruct the originally received first data stream by replacing data associated with the unrecognizable characteristic with data associated with the recognizable characteristic to create a reconstructed first data stream; and
provide a notification that the entity is identified in the reconstructed first data stream.

20. The non-transitory computer-readable medium of claim 15, wherein the one or more instructions, when executed by the one or more processors, further cause the one or more processors to:

supplement the first data stream with metadata, associated with the recognizable characteristic, based on the recognizable characteristic corresponding to the unrecognizable characteristic.

* * * * *